(12) United States Patent
Halter et al.

(10) Patent No.: US 9,408,340 B2
(45) Date of Patent: Aug. 9, 2016

(54) COUPLING DEVICE AND AGRICULTURAL MACHINE COMPRISING SUCH A DEVICE

(71) Applicant: KUHN S.A., Saverne (FR)

(72) Inventors: Cedric Halter, Wasselonne (FR); Joel Wilhelm, Saint-Louis (FR)

(73) Assignee: KUHN S.A., Saverne (FR)

( * ) Notice: Subject to any disclaimer, the term of this patent is extended or adjusted under 35 U.S.C. 154(b) by 0 days.

(21) Appl. No.: 14/404,498

(22) PCT Filed: Jun. 5, 2013

(86) PCT No.: PCT/FR2013/051275
§ 371 (c)(1),
(2) Date: Nov. 28, 2014

(87) PCT Pub. No.: WO2014/001671
PCT Pub. Date: Jan. 3, 2014

(65) Prior Publication Data
US 2015/0107211 A1    Apr. 23, 2015

(30) Foreign Application Priority Data

Jun. 25, 2012 (FR) ..................... 12 55985

(51) Int. Cl.
*A01B 59/06* (2006.01)
*A01D 34/66* (2006.01)
*A01B 63/10* (2006.01)

(52) U.S. Cl.
CPC ............ *A01B 59/066* (2013.01); *A01B 59/064* (2013.01); *A01B 63/10* (2013.01); *A01D 34/662* (2013.01)

(58) Field of Classification Search
CPC ...... A01B 61/046; A01B 63/00; A01D 34/24; A01D 34/28; A01D 34/243; A01D 34/246; A01D 34/283; A01D 34/662

USPC ........ 56/14.9, 15.8, 15.9, 157, 214, 208, 255, 56/283

See application file for complete search history.

(56) References Cited

U.S. PATENT DOCUMENTS 2,806,340 A * 9/1957 Huddle ................. A01D 34/24 56/283
3,834,142 A * 9/1974 Johnston ............... A01D 78/04 56/15.8

(Continued)

FOREIGN PATENT DOCUMENTS

EP    0456900 A2    11/1991
EP    0642731 A1    3/1995

(Continued)

OTHER PUBLICATIONS

International Search Report issued Aug. 20, 2013 in PCT/FR2013/051275 filed Jun. 5, 2013.

*Primary Examiner* — John G Weiss
(74) *Attorney, Agent, or Firm* — Oblon, McClelland, Maier & Neustadt, L.L.P.

(57) ABSTRACT

A coupling device for an agricultural machine including a support for hitching to a tractor and at least one arm articulated to the support and protruding from the support in a direction parallel to a direction of advance of the tractor, the arm carrying, in an articulated manner, a chassis carrying a work element having a cutting angle relative to the ground to allow fine control of the cutting angle during movements of the work element. The coupling device further includes an upper connecting-rod, a lower connecting-rod, and a central connecting-rod, each of the upper and lower connecting-rods is articulated to the support and the central connecting-rod to form, projected in a vertical plane parallel to the direction of advance, a deformable quadrilateral, and the central connecting-rod is articulated to the chassis. An agricultural machine can include the coupling device.

21 Claims, 3 Drawing Sheets

(56) References Cited

U.S. PATENT DOCUMENTS

| | | | | |
|---|---|---|---|---|
| 4,930,801 A * | 6/1990 | Gillund | ............... | A01B 59/048 |
| | | | | 172/298 |
| 4,970,848 A * | 11/1990 | Neuerburg | ........... | A01B 61/044 |
| | | | | 56/10.4 |
| 5,901,538 A * | 5/1999 | Vohl | ..................... | A01D 34/662 |
| | | | | 144/34.1 |
| 6,116,007 A * | 9/2000 | Eggena | ................. | A01D 34/64 |
| | | | | 56/10.5 |
| 6,125,619 A | 10/2000 | Wolff | | |
| 7,997,053 B2 * | 8/2011 | Dairon | ................. | A01B 33/087 |
| | | | | 56/15.8 |
| 2014/0033671 A1 * | 2/2014 | Halter | ................. | A01B 73/044 |
| | | | | 56/255 |

FOREIGN PATENT DOCUMENTS

| | | |
|---|---|---|
| EP | 0876748 A1 | 11/1998 |
| EP | 1593294 A1 | 11/2005 |

* cited by examiner

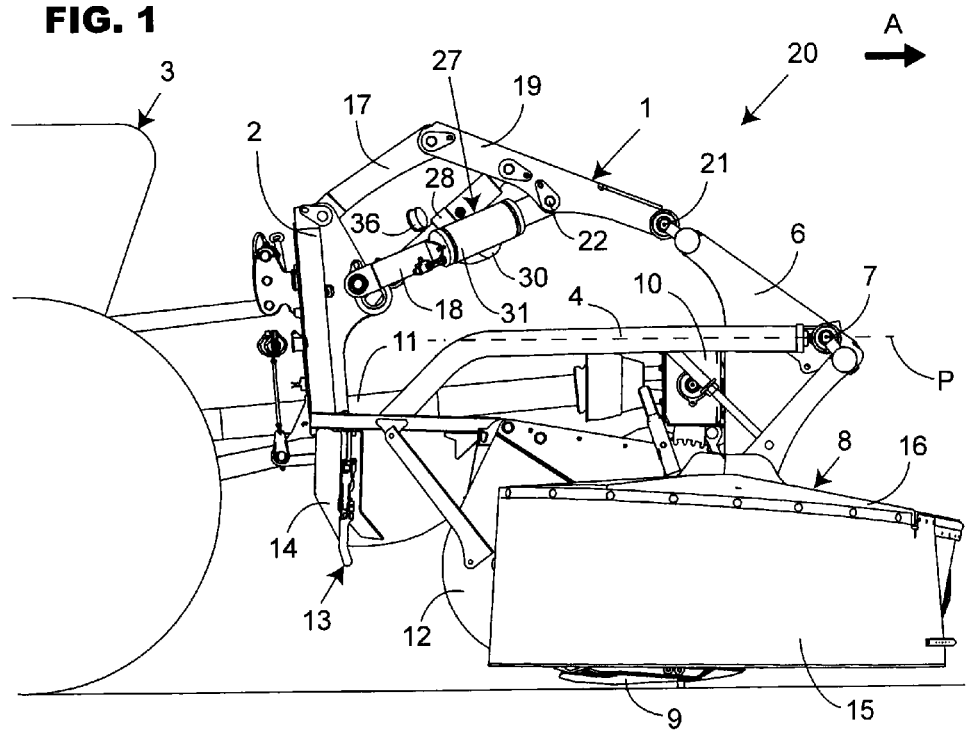
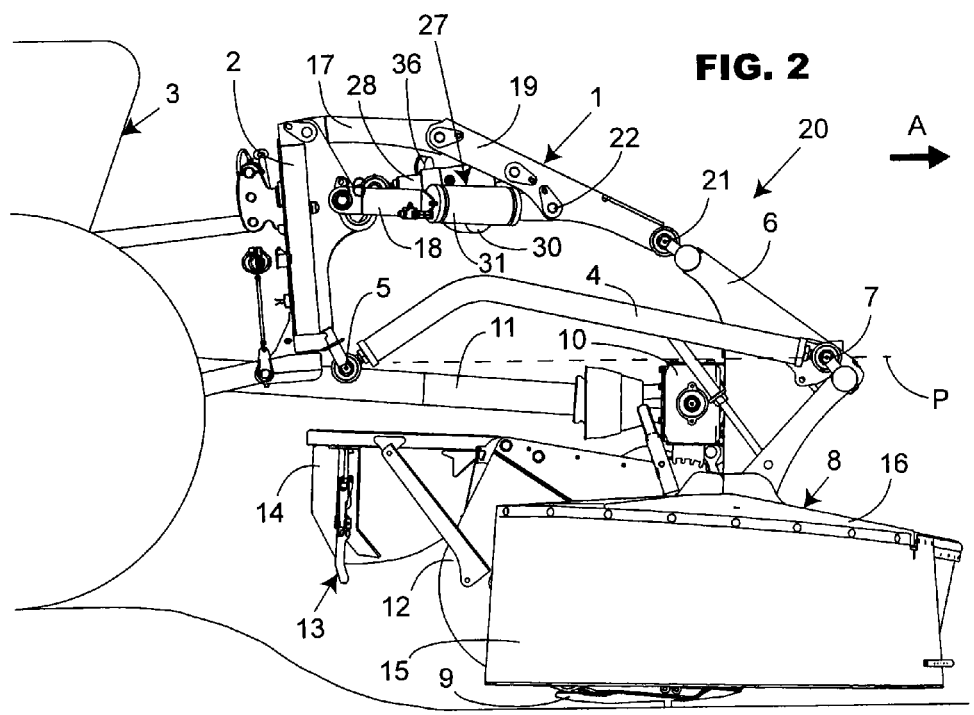

COUPLING DEVICE AND AGRICULTURAL MACHINE COMPRISING SUCH A DEVICE

BACKGROUND OF THE INVENTION

1. Field of the Invention

The present invention relates to a coupling device for an agricultural machine, in particular a mower, comprising a coupling support that can be mounted on a three-point hitch of a tractor and at least one arm articulated to the coupling support and protruding from the coupling support in a direction parallel to the direction of advance of the tractor, said arm carrying, in an articulated manner, a chassis provided to carry a work element.

2. Description of the Related Art

On a coupling device of this type known from document GB 2 013 466 A, the arm is surmounted by a connecting-rod articulated to the coupling support and the chassis. Thus, the coupling-rod and the arm form, projected in a vertical plane parallel to the direction of advance, a deformable quadrilateral. During work, the work element moves over the ground. The unevennesses thereof cause the chassis carrying the work element to move, at least vertically, in order to follow the contour of the terrain on which the agricultural machine is moving. In particular in the case of a mower, the work element, for example comprising discs or cutting drums, forms an angle relative to the ground called cutting angle. During work, this angle may be close to zero in particular with cutting drums, i.e., the latter rotate in a plane substantially parallel to the ground. However, with cutting discs, the front part thereof is slightly lower than their rear part. This is referred to as a positive cutting angle. In locations where the ground has hollows, the work element and, subsequently, the chassis move downward relative to the coupling support. The cutting angle then evolves such that the front part of the work element is significantly lower than its rear part. This allows the work element to effectively cut plants in the hollow locations of the terrain. Conversely, when the work element encounters a bump and is required to lift up, the cutting angle evolves such that the front part of the work element is higher than its rear part. The cutting angle is then negative. This allows the work element to slide over the obstacle without being damaged and without dirtying the cut plants with soil.

In order to guarantee a good work quality on terrain with a very uneven profile, it is desirable for the coupling device to allow the work element to move vertically with a great amplitude. On the known coupling device, the connecting-rod and the arm have similar lengths and therefore form a quadrilateral close to a parallelogram. In that case, the cutting angle changes little between the highest position of the work element relative to the coupling support, and its lowest position relative to the latter. The variation law of the cutting angle is then determined so as to prioritize rather the positive cutting angle values or the negative values. With a cutting angle evolving rather in the positive values, the work quality will be deteriorated on bumps, in which the work element will tend to become embedded. Conversely, a cutting angle oriented toward the negative values will deteriorate the work quality in the hollows. The connecting-rod and the arm could also have very different lengths. The connecting-rod could in particular be substantially shorter than the arm. Such a geometry would allow the cutting angle to evolve between two extreme values very distant from each other, such that the work element has an optimal inclination on significant bumps or in significant hollows.

During vertical movements of the work element, the articulation between the chassis and the connecting-rod follows a circular path relative to the coupling support. In fact, the cutting angle evolves more or less linearly with regard to the height of the work element relative to the coupling support. As a result, the upper coupling-rod cannot control the movements of the chassis so that the work element always has an optimal inclination, irrespective of the contour of the terrain. Furthermore, on the known coupling device, it is necessary for the coupling-rod and the arm to have a reduced length in order to preserve a reduced bulk for the coupling device in the direction of advance. In order nevertheless to ensure a significant vertical movement amplitude of the work element, the connecting-rod and the arm are then caused to take on a large angle. However, all of the forces exerted on the work element are collected by the connecting-rod and the arm. As a result, the articulations of the latter with the chassis and the coupling support undergo significant stresses.

Another coupling device of an agricultural machine is known from document EP 1 593 294 A1. This document describes a front mower comprising a coupling support to which an arm is articulated. The latter protrudes from the coupling support in the direction of advance. At its front end, the arm carries two connecting-rods extending backward toward the tractor and connected to a chassis carrying a work element. A modification of the length of these connecting-rods causes a significant modification in the length of the machine and/or in the position of the chassis relative to the coupling support. The mass distribution of the machine is noticeably affected, which has harmful effects on following the terrain and/or on the resistance of the various articulations. Additionally, it is difficult to modify the position of the articulation points of the connecting-rods on the chassis in significant proportions, given the immediate proximity of the work elements and the associated driving elements. With such a machine, the designer is faced with difficulties when he wishes to modify the variation law of the cutting angle, because the geometric possibilities allowing it are limited by the bulk and mass distribution constraints.

BRIEF SUMMARY OF THE INVENTION

The present invention aims to propose a coupling device for an agricultural machine that does not have the aforementioned drawbacks. This device in particular makes it possible to obtain a good adaptation to the contour of the terrain and to control the work element to obtain a good work quality.

To that end, an important feature of the invention lies in the fact that the coupling device additionally comprises an upper connecting-rod, a lower connecting-rod and a central connecting-rod, that each of the upper connecting-rod and lower connecting-rod is articulated to the coupling support and the central connecting-rod so as to form, projected in a vertical plane parallel to the direction of advance, a deformable quadrilateral, and that the central connecting-rod is articulated to the chassis.

This design allows the cutting angle to evolve between a negative extreme value and a positive extreme value that are significantly distant from each other. Thus, the coupling device guarantees that the work element always has an optimal inclination relative to the terrain, on significant bumps or in significant hollows, and in any intermediate vertical position. Furthermore, the cutting angle may evolve nonlinearly with regard to the height of the work element relative to the coupling support. The coupling device according to the invention therefore allows fine control of the cutting angle. Additionally, the designer of such a coupling device has great freedom to obtain the desired variation law of the cutting angle, since for the most part it suffices to change the length of the connecting-rods or the position of the different articulations relative to each other and/or to the chassis and/or to the coupling support. Such changes can be made without any noteworthy impact on the total bulk of the coupling device and the machine, and on the mass distribution of the machine. Lastly, the forces exerted on the work element are better distributed between the arm and the different connecting-rods, the articulations of which undergo lower stresses, which extends the lifetime of the coupling device. Another significant feature of the invention consists in the fact that the arm is connected to the chassis by a front articulation and that the front articulation is situated above the front part of the work element. This feature allows a significant vertical travel of the chassis and of the work element while keeping the pivoting angle of the arm in a reduced range, resulting in reasonable forces in the different articulations. Additionally, a significant lifting of the chassis and of the work element is favored by the fact that the arm has an upwardly bent shape starting from the coupling support.

BRIEF DESCRIPTION OF THE SEVERAL VIEWS OF THE DRAWINGS

Other features and advantages of the invention will emerge from the description below in reference to the attached drawings which show, as a non-limiting example, several example embodiments of the coupling device according to the invention.

In these drawings:

FIG. 1 shows a side view of one example embodiment of a coupling device according to the invention, in a work position on a flat part of the terrain;

FIG. 2 shows a side view of the same example embodiment, in a work position on a hollow part of the terrain;

DETAILED DESCRIPTION OF THE INVENTION

Figure 3:
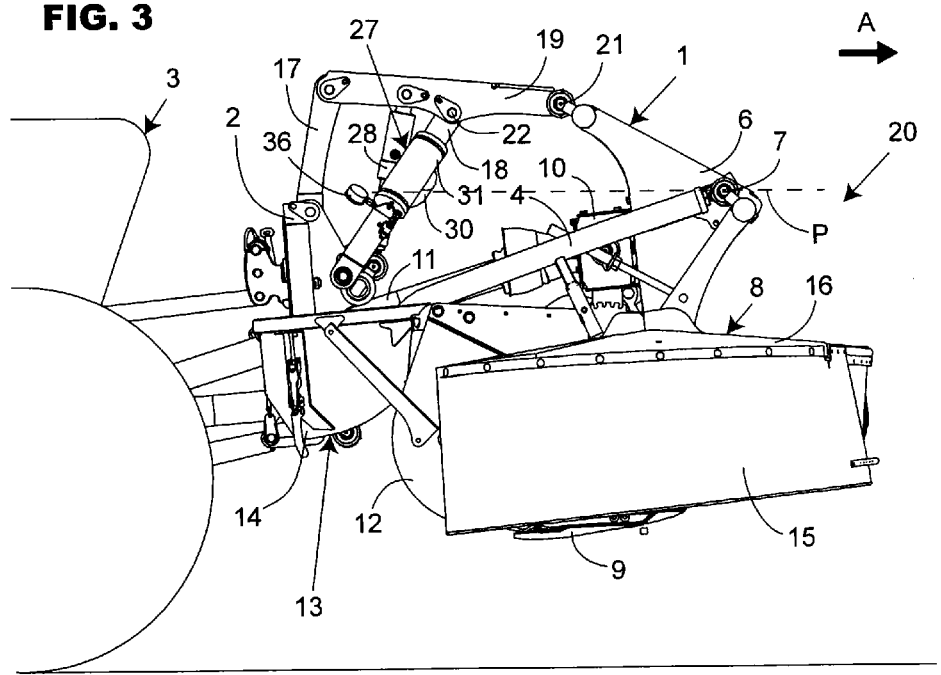
FIG. 3 shows a side view of the same example embodiment, in a raised position.

In the following description, the notions "lower", "upper", "bottom", "top", "below", "upward" and "above" are defined relative to the ground, and the notions "front", "rear", "backward", "downstream", "forward", "rearward", "left" and "right" are defined relative to the direction of advance (A).

As shown in FIG. 1, the coupling device (1) comprises a coupling support (2) that can be mounted on a three-point hitch of a tractor (3) that is only partially shown. The coupling support (2) for example has the form of a machine-welded structure. In its lower part, it includes two pins designed to be attached to the lower coupling arms of the tractor (3). In its upper part, it comprises one or more holes that can receive an axis for connection to an upper connecting-rod of the tractor (3). The coupling device (1) also comprises at least one arm (4) articulated to the coupling support (2). The arm (4) protrudes from the coupling support (2) in a direction parallel to the direction of advance (A) of the tractor. In the example embodiments, the arm (4) protrudes from the coupling support (2) in the direction of advance (A). The arm (4) is connected to the coupling support (2) by a rear articulation (5) and carries a chassis (6) via a front articulation (7). The chassis (6) is provided to support a work element (8). In the example embodiments, the work element (8) comprises cutting rotors such as discs or drums provided with blades that extend beyond the periphery of the rotors. The latter are mounted on bearings arranged at more or less regular intervals on a cutterbar (9), and are, during operation, made to rotate rapidly using a train of gears incorporated into a sealed casing containing a lubricant such as oil. When they are set in rotation, the blades then cut the plants rising above the ground, such as grass or other forage plants. The casing of the cutterbar (9) has the form of an elongated parallelepiped. The train of gears is actuated by transmission means able to transmit the necessary power from the tractor (3), this transmission means in particular comprising a gear casing (10) and an articulated transmission element (11). In the example embodiments, the gear casing (10) is situated above the work element (8). It is rigidly connected to the chassis (6). It would nevertheless be conceivable having the gear casing (10) articulated to the chassis (6) and for its movements to be controlled for example by a lever connected to other elements of the coupling device (1). The articulated transmission element (11) has the form of a shaft carrying, at one end, a universal joint connected to the gear casing (10), and at its other end, a quick connecting means to the power take-off of the tractor (3). The transmission means could also comprise a hydraulic or electric motor. The work element (8) may comprise conditioning elements (12) for cut plants arranged downstream from the cutterbar (9). These conditioning elements (12) are supported by the chassis (6). They may be formed by one or more rotors for example carrying fingers or flails which cooperate with a metal sheet and a comb arranged above said rotors. This metal sheet and/or this comb are optionally adjustable in order to modify the intensity of the conditioning. The conditioning element (12) could also be formed by rollers having a raised design on their surface, for example a chevron design. The work element (8) may also include windrowing elements (13), such as swath shields or windrowing drums arranged at the lateral ends of the cutterbar (9). The windrowing elements (13) could also be formed by one or more augers or conveyor belts arranged perpendicular to the direction of advance (A). In the example embodiments, the chassis (6) carries swath shields (14) that make it possible to orient the stream of cut plants between the front wheels of the tractor (3). Lastly, the work element (8) may comprise a protection element (15). The latter at least partially surrounds the cutterbar (9) and potential conditioning (12) and/or windrowing (13) elements previously described. The protection element (15) for example comprises a flexible cloth that extends vertically so as to form the front, left and right faces of the protection element (15). This flexible cloth is assembled, on its upper periphery, to a hood forming the upper face of the protection element (15). This hood is made up of one or more metal sheets assembled to each other, and may comprise parts made from a synthetic material. The hood is connected to the chassis (6) and may comprise foldable parts. The work element (8) comprises a front part (16) which, in the example embodiment of the figures, is formed by the front upper face of the protection element (15). The protection element (15) partially hides the chassis (6). In FIG. 1, a part of the chassis (6) can be seen that emerges above the protection element (15); it has a triangular nose shape that carries the front articulation (7) connecting the chassis (6) to the arm (4).

It remains possible to consider the chassis (6) carrying a work element (8) of a different nature, for example comprising tedder or windrowing rotors for plants spread out over the ground, or grinding elements or even a rotary harrow, this list not being exhaustive. The coupling device (1) is designed to be part of an agricultural machine that may thus be a machine for soil-working or haymaking, in particular a mower, for example a front mower, or a rake or a tedder.

The coupling device (1) according to the invention additionally comprises an upper connecting-rod (17), a lower connecting-rod (18) and a central connecting-rod (19). Each upper connecting-rod (17) and lower connecting-rod (18) is articulated to the coupling support (2) and the central connecting-rod (19) so as to form, projected on a vertical plane parallel to the direction of advance (A), a deformable quadrilateral. The central connecting-rod (19) is articulated to the chassis (6).

The different articulations of the coupling device (1) may, in a known manner, be formed by axes and/or ball joints.

In the illustrated example embodiments, the coupling device (1) is provided to be part of a front machine. The arm (4), the upper connecting-rod (17) and the lower connecting-rod (18) protrude from the coupling support (2) in the direction of advance (A). In this way, the coupling device (1) extends in the direction of advance (A) from the coupling support (2). Outside the articulated transmission element (11), there are no components present at the rear of the coupling support (2). This makes the coupling device (1) and the machine (20) particularly compact in the direction of advance (A). Furthermore, the coupling support (2) can be brought much closer to the three-point hitch of the tractor (3), which makes the center of gravity of the coupling device (1) and the machine (20) close to the tractor (3). An excessive load on the front axle of the tractor (3) is thus avoided.

It would, however, be conceivable that the arm (4) and at least one of the upper connecting-rod (17) and lower connecting-rod (18) protrude from the coupling support (2) in a same direction parallel to the direction of advance (A). This implies that the coupling device (1) could be designed so as to be connected to a three-point hitch situated at the rear of the tractor (3). In that case, the coupling support (2) illustrated in the figures would in practice amount to a frame carrying the arm (4), the upper connecting-rod (17) and the lower connecting-rod (18). The arm (4) and the connecting-rods (17 and 18) would extend in front of the frame. The frame would be extended forward by a beam for example extending above the connecting-rods (17 and 18). This beam would in turn, in its front part, be connected to a coupling device designed to be connected to the three-point hitch situated at the rear of the tractor (3).

Preferably, the front articulation (7) of the arm (4) is, relative to the ground, placed at a greater distance than the rear articulation (5) irrespective of the position of the chassis (6) relative to the coupling support (2). Thus, when the work element (8) encounters an obstacle such as a stone or a bump in the terrain, the forces exerted on it, in a direction opposite the direction of advance (A), force it to rise above the obstacle. Thus, the work element (8) moves simultaneously upward and backward. This advantageous geometry avoids damaging the work element (8) or other elements of the coupling device (1) or the machine (20). It also limits the risk of dirt entering the cut plants. The invention provides that this advantageous arrangement of the front and rear articulations (5 and 7) relative to one another is respected even in the lowest position of the chassis (6) relative to the coupling support (2). In this case, a virtual line (D) passing through said articulations (5 and 7), oriented forward and upward, for example forms an angle close to 1° with the horizontal.

Preferably, the front articulation (7) is situated above the front part (16) of the work element (8). As a result, the arm (4) has a relatively significant length. As in particular shown by FIG. 1, the front articulation (7) is situated above the protection element (15) that is part of the work element (8). In this figure, which shows the machine (20) from the side, it clearly appears that the length of the arm (4) is close to the total bulk of the machine (20) in the direction of advance (A). This feature allows a significant vertical travel of the chassis (6) and the work element (8) while keeping the pivoting angle of the arm (4) around the rear articulation (5) in a reduced range. Thus, the virtual line (D), passing through the front (7) and rear (5) articulations, oriented forward and upward, can form an angle with the horizontal that is slightly larger than zero in the lowest position of the chassis (6) relative to the coupling support (2)—see the 1° angle previously mentioned as an example—while in the other positions of the chassis (6), that same line will form a larger but nevertheless reasonable angle, for example substantially less than 45°. In this way, the forces exerted on the work element (8), and which are partially collected by the arm (4) and therefore by the front (7) and rear (5) articulations, do not cause excessive stresses in the latter parts.

It will be understood in light of FIGS. 2 and 3 that the chassis (6) and the work element (8), rising relative to the coupling support (2), come closer to the arm (4). In FIG. 3, the chassis (6) and the work element (8) are shown in a raised position relative to the coupling support (2). This position could be a transport position for the machine (20), in which the chassis (6) is raised to its maximum, or even a work position on an extremely raised portion of the terrain, for example when the work element (8) encounters a large bump.

In order to keep a significant upward movement amplitude, the invention advantageously provides that the arm (4) has an upwardly bent shape starting from the coupling support. This feature is clearly shown in the figures. It becomes especially meaningful when the bulk of the work element (8) in the direction of advance (A) is substantially increased by conditioning (12) and windrowing (13) elements situated downstream from the cutterbar (9).

The invention advantageously provides that the upper connecting-rod (17), the lower connecting-rod (18) and the central connecting-rod (19) extend mostly above a substantially horizontal plane (P) passing through the front articulation (7). This feature preserves the possibility for the chassis (6) of moving upward over a large distance, since the space between the bent arm (4) and the chassis (6) is not obstructed by said connecting-rods (17, 18 and 19). Furthermore, the transmission means can then be housed between the chassis (6) and the connecting-rods (17, 18 and 19). Lastly, such a height arrangement of the connecting-rods (17, 18 and 19) shelters them from dirt or fodder projected during work that could harm the mobility of the coupling device (1) over time.

FIG. 1 in particular shows that the upper connecting-rod (17) and the lower connecting-rod (18) are preferably superposed. Thus, when said connecting-rods (17 and 18) move following movements of the chassis (6), they are prevented from being able to cross, which could cause the coupling device (1) to become blocked.

It will also be noted that, preferably, the upper connecting-rod (17) and the lower connecting-rod (18) are, starting from the coupling support, oriented from the bottom towards the top following the direction of advance (A). In the figures, they are therefore oriented upward and forward starting from the coupling support. When the chassis (6) moves vertically, said connecting-rods (17 and 18) pivot upward and backward. They follow the same movement as that of the arm (4). Thus, when the work element (8) encounters an obstacle, the coupling device (1), with the exception of the coupling support (2), moves upward and backward, pulling the chassis (6) in the same direction. This advantageous geometry avoids damaging the work element (8) or other elements of the coupling device (1) or the machine (20), and limits the insertion of dirt into the cut plants.

Figure 4:
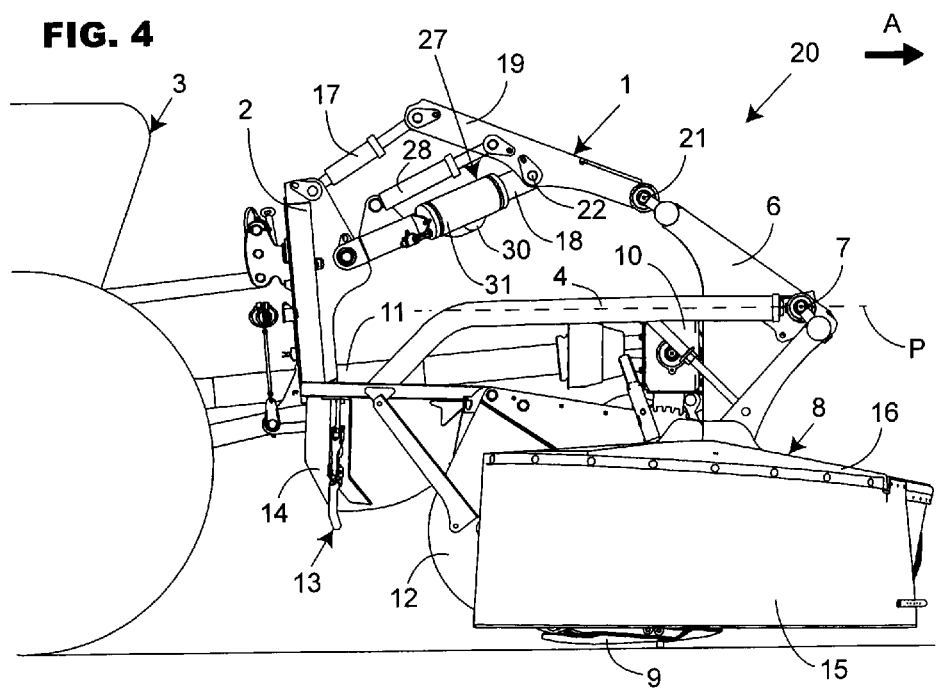
FIG. 4 shows a side view of another example embodiment of a coupling device according to the invention.

For the rest, it is conceivable for at least one of the upper connecting-rod (17) and the lower connecting-rod (18) being adjustable lengthwise. This feature covers various embodiments of the connecting-rod(s) (17, 18) in question. Such a connecting-rod with an adjustable length may thus comprise elements screwed with a left pitch and a right pitch. It may also be made up of elements able to slide in one another and be immobilized relative to one another using a pin that can engage in several adjusting holes. Lastly, such a connecting-rod may take the form of a hydraulic, pneumatic or electric jack. The example of a hydraulic jack is illustrated in FIG. 4.

As shown in the figures, the central connecting-rod (19) is connected to the chassis (6) by a central articulation (21) and to the lower connecting-rod (18) by a lower articulation (22). Preferably, an orthogonal projection of the central articulation (21) over a line passing through the front articulation (7) and the lower articulation (22) is arranged between the front articulation (7) and lower articulation (22). FIG. 1 shows that the distance separating the front articulation (7) from the lower articulation (22) is relatively significant in proportion to the total bulk of the coupling device (1) in the direction of advance (A). The central articulation (21) being thus arranged, the designer of the coupling device (1) can place it in the optimal location allowing the cutting angle to vary between positive values and negative values. During work, this angle is preferably comprised between 2° and 4°. In the locations where the soil has hollows, the work element (8) and subsequently the chassis (6) move downward relative to the coupling support (2). The cutting angle then evolves toward values much higher than zero. In the lowest position of the chassis (6) relative to the coupling support (2), this angle is preferably comprised between 7° and 10°. This allows the work element (8) to effectively cut plants in the hollow locations of the terrain. Conversely, when the work element (8) encounters a bump and is therefore made to rise, the cutting angle becomes negative. In the highest position of the chassis (6) relative to the coupling support (2), this angle is preferably comprised between −15° and −7°. This allows the work element (8) to slide over the obstacle without being damaged and without soiling the cut plants with dirt.

Figure 5:
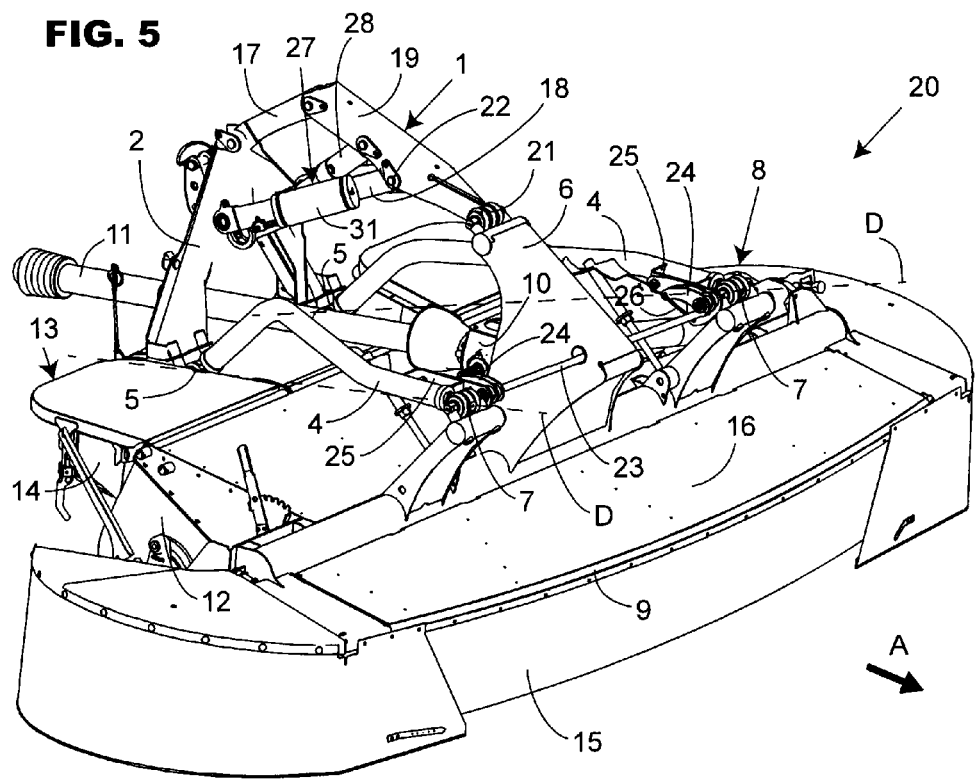
FIG. 5 shows a perspective view of a coupling device according to the invention.

As shown in FIG. 5, the coupling device (1) preferably comprises two arms (4) arranged on either side of the central connecting-rod (19). It can be seen that the two arms (4) are placed symmetrically relative to the central connecting-rod (19), but this feature is not mandatory. The two arms (4) provide the main part of the maintenance of the chassis (6) in a horizontal plane, while the upper connecting-rod (17), the lower connecting-rod (18) and the central connecting-rod (19) give the chassis (6) the desired cutting angle for the different vertical positions that the chassis (6) may take relative to the coupling support (2). At the same time, the forces exerted on the chassis (6) during work are well distributed between the arms (4) and the different connecting-rods (17, 18 and 19).

According to an advantageous feature of the invention, the two arms (4) are arranged on either side of the central connecting-rod (19) such that the distance separating their respective front articulations (7) is greater than the distance separating their respective rear articulations (5). The virtual lines (D) passing through the respective front (7) and rear (5) articulations of the two arms cross at a virtual point located rearward of the coupling support (2). Better stability of the chassis (6) is thus obtained during evolutions on uneven terrain or when the resistive forces, related to the action of the work element (8) and the advance, are not uniformly distributed on the chassis (6) in a direction perpendicular to the direction of advance (A). It will be added that this advantageous effect is reinforced by the fact that the virtual lines (D) form a smaller angle with the horizontal, for example comprised—as previously described—between 1° and 45°.

The stability of the chassis (6) may be further improved by providing that the distance separating the front articulations (7) is at least equal to one quarter of the total working width of the work element (8), the latter being defined as the width of the terrain portion worked when the work element (8) moves in the direction of advance (A). This feature limits the tendency of the chassis (6) to pivot around a vertical axis—in particular due to the play existing in the various articulations—when the majority of the forces that it receives are sometimes on its left, sometimes on its right.

In FIG. 5, the distance separating the front articulations (7) is comprised between one third and two thirds of the total working width of the work element (8).

Preferably, the coupling device (1) comprises a torsion bar (23) connected to each of the arms (4), and the torsion bar (23) extends from one of the front articulations (7) toward the other. The torsion bar (23) comprises, at each of its ends, a grooved part that cooperates with a lever (24). A fastening sheet (25) is rigidly fastened to the corresponding arm (4). The lever (24) is connected to this fastening sheet (25) by an articulation that is preferably substantially aligned with the corresponding front articulation (7). In this way, the lever (24) can pivot around an axis substantially coincident with the longitudinal axis of the torsion bar (23). In its rear part, the lever (24) is articulated to a link-rod (26). The latter extends below the lever (24) toward the torsion bar (23) to which the link-rod (26) is also articulated. The length of the connecting-rod (26) can be adjusted. In this way, a length variation of the link-rod (26) makes it possible to adjust the torsion torque that the lever (24) exerts on the torsion bar (23). The torsion bar (23) is therefore adjustably pre-stressed. The central articulation (21) as well as the front (7) and rear (5) articulations are preferably formed by ball joints. They therefore allow the chassis (6) to pivot around an axis oriented in the direction of advance (A), when the work element (8) evolves over uneven terrain. This pivoting movement of the chassis (6) causes torsion of the torsion bar (23), which, in reaction, brakes the movements of the chassis (6), like a stabilizer bar. A modification of the pre-stress of the torsion bar (23) makes it possible to adjust the braking intensity of the movements. The chassis (6) can be heavier on one side than the other, or can be placed asymmetrically relative to the central connecting-rod (19). In that case, the pre-stress is adjusted using the link-rod(s) (26) such that when idle, the chassis (6) retains an orientation parallel to the ground.

According to an advantageous feature of the invention, the coupling device (1) includes a control device (27). This simultaneously achieves lightening of the coupling device (1) and of the chassis (6) during work, damping of the movements of the coupling device (1) and of the chassis (6) during work, and movement of the work element (8) relative to the coupling support (2) between a work position, a maneuvering position and a transport position. During work, the lightening is intended to limit the pressure that the work element (8) exerts on the ground when it moves. The work element (8) is thus prevented from scraping the ground too much or becoming too embedded therein, which preserves it from excessive wear and limits the resistance to forward movement of the machine (20). In the case of a harvesting machine such as a mower, a rake or a tedder, the lightening also avoids introducing too many impurities—dirt, stones—into the worked plants. The control device (27) also performs a damping function so as to prevent the work element (8) from bouncing on obstacles. Lastly, the work element (8) can be moved relative to the coupling support (2) between a work position, in which the work element (8) rests on the ground, a maneuvering position, in which the work element (8) is raised at some distance from the ground to pass over obstacles or plants that have already been worked, and a transport position, in which the work element (8) is maximally raised for easy transport of the machine (20) on open road or from one parcel to another.

Preferably, the control device (27) comprises at least one jack (28). The latter may be articulated between the coupling support (2) and one of the lower connecting-rod (18), upper connecting-rod (17) and central connecting-rod (19), as shown in FIGS. 1 to 3. As shown in FIG. 4, the jack (28) can also be articulated between two of the lower connecting-rod (18), upper connecting-rod (17) and central connecting-rod (19). The jack (28) may be hydraulic, pneumatic or electric. In the figures, a single hydraulic jack (28) is provided; it is articulated between the coupling support (2) and the central connecting-rod (19). The jack (28) is thus, over the majority of its length, advantageously housed in the space delimited by the different connecting-rods (17, 18 and 19), which preserves the compactness of the coupling device (1). Furthermore, the jack (28) used has a relatively small length, since it is proportionate to the lengths of the connecting-rods (17, 18 and 19), the latter being rather short in light of the general dimensions of the coupling device (1) and the chassis (6). It should also be noted that the reduced pivoting angle of the arm (4) allows the jack (28) to work over a reduced travel, which contributes to a shorter jack. It is therefore possible to use a single jack (28) with small dimensions with a relatively low cost. Thus arranged, the jack (28) frees the viewing field for the driver, the area situated above the left and right arms (4) being unoccupied. This is clearly shown by FIG. 5. Lastly, the use of a single jack (28) simplifies the production of the control device (27) by reducing the number of pipes, valves and connections.

Figure 6:
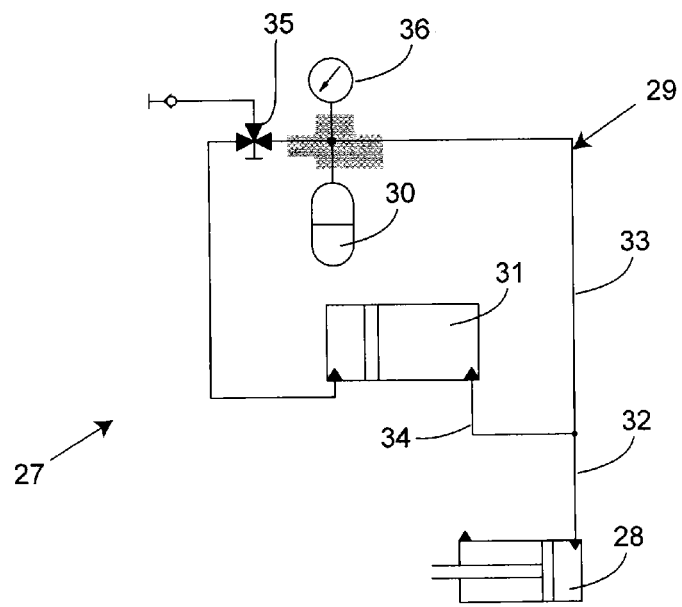
FIG. 6 shows a hydraulic control diagram of a coupling device according to the invention.

As shown in FIG. 6, a fluid circuit (29) connects the jack (28), an accumulator (30) and a lifting cylinder (31) to each other. The accumulator (30) comprises a sphere whereof the inner volume is separated into two chambers by a flexible membrane, one chamber containing a pressurized gas such as nitrogen, the other chamber containing oil. The lifting cylinder (31) has the form of a barrel in which a piston can slide. The piston thus delimits two chambers of variable volume. The circuit (29) comprises a duct (32) that is divided into a first branch (33) and a second branch (34). The jack (28), which is preferably single-acting, is supplied with oil by the duct (32) and the first branch (33) is connected to a three-way cock (35). This first branch (33) supports the accumulator (30) as well as a pressure gauge (36). The second branch (34) is connected to one chamber of the lifting cylinder (31), the other chamber of the lifting cylinder (31) being connected to the three-way cock (35). The three-way cock (35) is connected to a hydraulic distributor, not shown, for supplying oil from the tractor (3). In order to move the chassis (6) relative to the coupling support (2), the three-way cock (35) is oriented so as to allow the oil to flow between the distributor and the lifting cylinder (31) only. A position of the distributor then makes it possible to send the oil into the lifting cylinder (31), the piston of which translates and moves a predetermined volume of oil toward the jack (28). This causes the lifting of the chassis (6) relative to the coupling support (2). Another position of the distributor makes it possible to return the oil from the lifting cylinder (31) to a tank, and the chassis (6) lowers under its own weight. The three-way cock (35) can be oriented so as to allow the oil to flow between the distributor and the first branch (33) only. By acting on the distributor, oil can then be sent into the first branch (33). Due to the orientation of the three-way cock (35), the piston of the lifting cylinder (31) remains immobile, resulting in increased pressure in the accumulator (30) and in the jack (28), and therefore increased lightening. When during work, the length of the jack (28) varies following movements of the chassis (6), it moves a relatively small volume of fluid, since the length and travel of the jack (28) are reduced. The damping can therefore keep a substantially constant value with an accumulator (30) having a reasonable size.

The invention is of course not limited to the example embodiments described above and shown in the attached figures. Changes remain possible, in particular regarding the composition or number of the various elements or by substituting technical equivalents, without going beyond the scope of protection.

The invention claimed is:

1. A coupling device for an agricultural machine, comprising:
   a coupling support that can be mounted on a three-point hitch of a tractor;
   at least one arm articulated to the coupling support and protruding from the coupling support in a direction parallel to a longitudinal center line of the tractor, the arm carrying, in an articulated manner, a chassis provided to carry a work element; and
   an upper connecting-rod, a lower connecting-rod, and a central connecting-rod,
   wherein each of the upper connecting-rod and lower connecting-rod are articulated to the coupling support and to the central connecting-rod to form, projected in a vertical plane parallel to the longitudinal center line of the tractor, a deformable quadrilateral, and the central connecting-rod is articulated to the chassis.

2. A coupling device according to claim 1, wherein the arm and at least one of the upper connecting-rod and lower connecting-rod protrude from the coupling support in a same direction parallel to the longitudinal center line of the tractor.

3. A coupling device according to claim 1, wherein the arm and/or at least one of the upper connecting-rod and lower connecting-rod protrude from the coupling support in the direction parallel to the longitudinal center line of the tractor.

4. A coupling device according to claim 1, wherein the arm is connected to the chassis by a front articulation and to the coupling support by a rear articulation, and the front articulation is, relative to the ground, placed at a greater distance than the rear articulation irrespective of the position of the chassis relative to the coupling support.

5. A coupling device according to claim 1, wherein the work element comprises a front part, the arm is connected to the chassis by a front articulation, and the front articulation is situated above the front part.

6. A coupling device according to claim 1, wherein the arm has an upwardly bent shape starting from the coupling support.

7. A coupling device according to claim 4, wherein the upper connecting-rod, the lower connecting-rod, and the central connecting-rod extend mostly above a substantially horizontal plane passing through the front articulation.

8. A coupling device according to claim 1, wherein the upper connecting-rod and the lower connecting-rod are superposed.

9. A coupling device according to claim 8, wherein the upper connecting-rod and the lower connecting-rod are, starting from the coupling support, oriented from a bottom towards a top following the direction parallel to the longitudinal center line of the tractor.

10. A coupling device according to claim 1, wherein at least one of the upper connecting-rod and the lower connecting-rod is adjustable in length.

11. A coupling device according to claim 4, wherein the central connecting-rod is connected to the chassis by a central articulation and to the lower connecting-rod by a lower articulation, and an orthogonal projection of the central articulation on a line passing through the front articulation and the lower articulation is arranged between the front articulation and the lower articulation.

12. A coupling device according to claim 4, comprising two arms which are arranged on either side of the central connecting-rod, such that a distance separating respective front articulations of the two arms is greater than a distance separating respective rear articulations of the two arms.

13. A coupling device according to claim 12, wherein the chassis carries the work element, and the distance separating the front articulations is at least equal to one quarter of a total working width of the work element.

14. A coupling device according to claim 13, wherein the distance separating the front articulations is between one third and two thirds of a total working width of the work element.

15. A coupling device according to claim 12, further comprising a torsion bar connected to each of the arms, and the torsion bar extends from one of the front articulations toward the other.

16. A coupling device according to claim 1, further comprising a control device that simultaneously achieves lightening of the coupling device and of the chassis during work, damping of movements of the coupling device and of the chassis during work, and movement of the work element relative to the coupling support between a work position, a maneuvering position, and a transport position.

17. A coupling device according to claim 16, wherein the control device comprises at least one jack articulated between the coupling support and one of the lower connecting-rod, the upper connecting-rod, and the central connecting-rod.

18. A coupling device according to claim 16, wherein the control device comprises at least one jack articulated between two of the lower connecting-rod, the upper connecting-rod, and the central connecting-rod.

19. A coupling device according to claim 17, wherein a fluid circuit connects the jack, an accumulator and a lifting cylinder to each other and a pressure of the fluid in the circuit is adjustable.

20. An agricultural machine, comprising a coupling device according to claim 1.

21. The agricultural machine according to claim 20, wherein the agricultural machine is a mower, or a front mower.

* * * * *